(12) United States Patent
Groenewolt et al.

(10) Patent No.: US 8,871,322 B2
(45) Date of Patent: Oct. 28, 2014

(54) HIGH-TRANSPARENCY POLYCARBONATES WITH SCRATCH-RESISTANT COATING, PROCESS FOR PRODUCTION THEREOF AND USE THEREOF

(75) Inventors: Matthijs Groenewolt, Munster (DE); Jan-Bernd Kues, Munster (DE); Stefanie Schroeder, Munster (DE); Pedro Cavaleiro, Viersen (DE); Hans-Leo Karminski, Essen (DE); Gunther Michael, Karlstein (DE)

(73) Assignee: BASF Coatings GmbH, Munster (DE)

( * ) Notice: Subject to any disclaimer, the term of this patent is extended or adjusted under 35 U.S.C. 154(b) by 554 days.

(21) Appl. No.: 13/129,528

(22) PCT Filed: Sep. 10, 2009

(86) PCT No.: PCT/EP2009/006563
§ 371 (c)(1),
(2), (4) Date: May 16, 2011

(87) PCT Pub. No.: WO2010/054711
PCT Pub. Date: May 20, 2010

(65) Prior Publication Data
US 2012/0121845 A1 May 17, 2012

(30) Foreign Application Priority Data
Nov. 15, 2008 (DE) .......................... 10 2008 057 524

(51) Int. Cl.
*G11B 7/24* (2013.01)
*C09D 4/06* (2006.01)

(52) U.S. Cl.
CPC .............. *C09D 4/06* (2013.01); *Y10S 977/814* (2013.01)
USPC ........................... 428/64.7; 427/164; 977/814

(58) Field of Classification Search
CPC ......... G11B 7/2534; G02B 1/105; G02B 1/11
USPC .......................... 428/64.7; 977/814; 427/164
See application file for complete search history.

(56) References Cited

U.S. PATENT DOCUMENTS

| 3,022,272 A | 2/1962 | Schnell et al. |
| 5,340,905 A | 8/1994 | Kuhling et al. |
| 5,399,659 A | 3/1995 | Kuhling et al. |
| 6,420,451 B1 | 7/2002 | Lin et al. |
| 8,486,539 B2 * | 7/2013 | Klein et al. ................ 428/480 |
| 2002/0111390 A1 | 8/2002 | Lin et al. |
| 2007/0237967 A1 * | 10/2007 | Buckel et al. .............. 428/423.1 |
| 2007/0281140 A1 | 12/2007 | Haubrich et al. |

FOREIGN PATENT DOCUMENTS

| CN | 1587325 A | 3/2005 |
| DE | 1031512 | 6/1958 |
| DE | 10004499 A1 | 8/2001 |
| DE | 102006020987 A1 | 11/2007 |
| EP | 1167452 B1 | 10/2004 |
| EP | 1685895 A2 | 8/2006 |
| JP | 2007056264 A | 3/2007 |
| JP | 2007206499 A | 8/2007 |
| WO | WO01/66653 A1 | 9/2001 |
| WO | WO02/24344 A2 | 3/2002 |
| WO | WO03/016411 A1 | 2/2003 |
| WO | WO03/044099 A1 | 5/2003 |
| WO | WO2004/020532 A1 | 3/2004 |
| WO | WO2005/056697 A2 | 6/2005 |
| WO | WO2006/028518 A2 | 3/2006 |
| WO | WO2006/079543 A1 | 8/2006 |
| WO | 2007128636 A2 | 11/2007 |
| WO | WO2008/068154 A2 | 6/2008 |
| WO | 2008108390 A1 | 9/2008 |
| WO | WO2009/118415 A1 | 10/2009 |

OTHER PUBLICATIONS

International Search Report for International application No. PCT/EP2009/006563 dated Jan. 15, 2010.
Written Opinion for International application No. PCT/EP2009/006563.
International Preliminary Report on Patentability for International Application No. PCT/EP2009/006563 issued May 17, 2011, 12 pages.

* cited by examiner

*Primary Examiner* — Elizabeth Mulvaney
(74) *Attorney, Agent, or Firm* — Cantor Colburn LLP (57) ABSTRACT

Disclosed is a coating composition for coating polycarbonate substrates. The coating composition comprises (A) at least one radiation-curing binder, (B) nanoparticles, and (C) optionally at least one reactive diluent and/or optionally a solvent, and wherein the nanoparticles (B) comprise silicon dioxide nanoparticles, the silicon dioxide nanoparticles have a $d_{50}$ of between 80 and 300 nm, and the silicon dioxide nanoparticles have a particle size distribution wherein less than 15% by weight of the particles have a size in the range of less than 80 nm, 75% to 95% by weight of the particles have a size in the range from 80 to 300 nm, 0% to 5% by weight of the particles have a size in the range from more than 300 to 1000 nm, and 0% to 5% by weight of the particles have a size in the range from more than 1000 nm to 10 000 nm.

21 Claims, 1 Drawing Sheet

HIGH-TRANSPARENCY POLYCARBONATES WITH SCRATCH-RESISTANT COATING, PROCESS FOR PRODUCTION THEREOF AND USE THEREOF

CROSS REFERENCE TO RELATED APPLICATIONS

This application is a National Phase Application of Patent Application PCT/EP2009/006563 filed on 10 Sep. 2009, which claims priority to DE102008057524.0, filed 15 Nov. 2008, both of which are hereby incorporated by reference in their entirety.

FIELD OF THE INVENTION

The present invention relates to a method of coating polycarbonate substrates by applying to a polycarbonate substrate a coating composition comprising (A) at least one radiation-curing binder, (B) nanoparticles, and (C) optionally solvents, to coating compositions suitable for this method, and also to the coated polycarbonate substrates obtainable by the method.

BACKGROUND OF THE INVENTION

Substitute materials for glass, for the production for example of sheets, windows, spectacle lenses, optical lenses or automotive and aircraft glazing elements, have for a number of years increasingly been realized is using transparent plastics. Plastics based on polycarbonates and polymethyl methacrylates, in particular, have become established.

The use of plastics of this kind is of interest particularly for the automobile section, since by means of the plastics it is possible to produce shapes which, using glass as a material of construction, are realizable not at all or only at unacceptably high expense. For example, polycarbonate has rapidly become established for the "glazing" of automobile headlights.

In addition to their easy deformability, the advantage of plastics such as polycarbonate lies not least in the fact that the plastics have a much lower specific density than glass, and accordingly, for example, the vehicle weight can be markedly reduced.

Polycarbonate, furthermore, is more ductile than glass and is therefore better able to absorb impacts from stones by dissipation of energy. A disadvantage of plastics in comparison to glass, however, is the lower level of hardness. The result of this is a poorer resistance to external mechanical damage and hence a lower scratch resistance and a lower abrasion resistance. Particularly for the use of such materials in highly challenging environments, therefore, it is necessary to protect them from abrasion and scratching.

Specifically in the sector of automobile glazing, however, there are exacting requirements, which are specified in the standards ECE 43, ASTM 1044, and ASTM 1003.

For the coating of polycarbonate with a scratch-resistant coat which exhibits excellent results in the abrasion test (tested by means of the Taber test) it is possible to use polymer systems with a variety of compositions.

Sol-gel systems are used variously for this purpose, sometimes by means of plasma processes. These systems are frequently prepared from modified silanes and alkoxides by means of hydrolysis and condensation processes. Owing to the reactivity of these systems, the stability of the paint mixture on storage is usually very short. Moreover, the stability in such systems usually makes it more difficult to set higher solids contents.

In addition, radiation-curable coating compositions are also used to coat polycarbonate substrates. Thus U.S. Pat. No. 6,420,451 describes radiation-curable coating compositions for coating optical substrates, lenses for example, comprising various plastics substrates, such as polycarbonate, for example. Besides monofunctional acrylates, the coating compositions comprise urethane acrylates and colloidal metal oxides, especially $SiO_2$ particles. As a result of their metal oxide particle content, these coating compositions lead to coatings featuring improved scratch resistance, and also exhibit effective adhesion to various substrates, and high compatibility with antireflection coatings in the case of the coating of optical lenses. In order to ensure transparency it is generally necessary to select a small particle size as compared with the wavelength of visible light, and so nanoscale metal oxides are used in these coating compositions that have small particle sizes, between 2 and 60 nm, preferably between 5 and 50 nm. Such nanoparticles are generally produced wet-chemically and in terms of price are ranked above silicon dioxide particles prepared by flame pyrolysis.

Commercial nanoparticles based on pyrogenically prepared (fumed) silica, in contrast, are substantially more favorable in price, and so it is entirely desirable, in coating compositions for coating polycarbonate substrates, to replace the special nanoparticles used, for example, in U.S. Pat. No. 6,420,451 by nanoparticles of that type that are based on pyrogenically prepared silica. The corresponding nanoparticles, however, is usually have substantially greater average particle sizes and therefore in general do not lead to transparent coatings.

Furthermore, WO06/028518 describes UV-curable coating compositions which comprise at least one radiation-curable (meth)acrylate, inorganic particles with a size of between 1 and 1000 nm, and optionally reactive diluents. Preferred particles are surface-modified $SiO_2$ nanoparticles with a size of 5 to 80 nm, more particularly smaller than 50 nm, and with a narrow particle size distribution. These coating compositions are used for producing coatings featuring enhanced abrasion resistance, especially plastics substrates, such as road reflectors, for example, or coatings with enhanced stability, such as the coating of filter papers, for oil filters, for example. Polycarbonate substrates, however, are not described in WO06/028518.

As already stated, however, coating compositions suitable for coating polycarbonate must not only be curable to give scratch-resistant coatings but must also, furthermore, lead to transparent coatings having very good optical properties. Indications as to how the transparency—required in addition to the scratch resistance—of the coated substrates might be achieved are absent as such from WO06/028518.

Furthermore, DE 10 2006 020 987 A1 discloses dispersions of pyrogenically prepared silicon dioxide in organic solvent and their use in coating materials, especially clearcoat materials. The silicon dioxide dispersions described therein have the advantage that the clearcoat materials comprising these dispersions have a lower gray haze (lower haze values, the haze value being the fraction in % of light which is scattered by more than 2.5° from the axis of incidence) than clearcoat materials with conventional silicon dioxide dispersions. This is achieved by a silicon dioxide particle coarse fraction that is reduced in comparison to that of conventional silicon dioxide dispersions. The dispersions described therein comprise silicon dioxide particles in which 20% to 98% by weight, preferably 60% to 95% by weight, of the particles have a size of between 10 nm and 1500 nm and 2% to 80% by weight, preferably 5% to 40% by weight, of the particles have a size of between 1500 nm and 4000 nm.

Nevertheless, the haze determined here, which is sufficient for conventional clearcoat applications, is still not sufficient for the optical quality required in transparent coatings for polycarbonates. Here, less than 1% of the light ought to be scattered in the original, unexposed coating; in other words, the coatings ought to have a haze value <1 directly after their production, in other words prior to exposures—such as scratch exposures, for example.

The problem addressed by the present invention, therefore, was that of providing coating compositions which are suitable for coating polycarbonate substrates and which lead to cured coatings having a high transparency, low gray haze (haze values less than 1, determined using the BYK-Gardner Hazemeter AT-4727 instrument), and good scratch and abrasion resistance. The coating compositions ought further to be easy to handle and exhibit good processing viscosity and good flow.

SUMMARY OF THE INVENTION

In light of the above-posited problem, a method has been found of coating polycarbonate substrates, more particularly transparent polycarbonate substrates, by applying to a polycarbonate substrate a transparent coating composition comprising (A) at least one radiation-curing binder, is (B) nanoparticles, and (C) optionally solvents and/or optionally reactive diluents, and wherein
(i) the coating composition comprises silicon dioxide nanoparticles (B),
(ii) the nanoparticles have a $d_{50}$ of between 80 and 300 nm, and
(iii) the nanoparticles (B) have a particle size distribution such that less than 15% by weight of the particles have a size in the range of less than 80 nm,
75% to 95% by weight of the particles have a size in the range from 80 to 300 nm,
0% to 5% by weight of the particles have a size in the range from more than 300 to 1000 nm, and
0% to 5% by weight of the particles have a size in the range from more than 1000 nm to 10 000 nm.

The present invention additionally provides the coating compositions used in this method, and also the coated polycarbonate substrates obtainable by the method, and their use.

In light of the prior art it was surprising and unforeseeable for the skilled worker that the problems addressed by the present invention could be solved by means of the method of the invention.

Thus it is surprising in particular that, despite the use of nanoparticles having an average particle size which is larger than that of the prior art (expressed here by the $d_{50}$ of between 80 and 300 nm), the coating compositions can be cured to form transparent coatings without gray haze, i.e., with a low haze value of less than 1, determined by means of the BYK-Gardner Hazemeter AT-4727 instrument. Furthermore, the coating compositions lead to coatings with a good scratch resistance and abrasion resistance; that is, the assembly performed by polycarbonate substrate and coating meets the challenge of the Taber test. A further advantage is that the coating compositions used in accordance with the invention are easy to handle and exhibit a good processing viscosity and good flow.

DESCRIPTION OF THE INVENTION

Inventively Employed Coating Composition
The Radiation-Curable Binder (A)

It is possible in principle to use all oligomers or polymers, in the form of what are called prepolymers, that are amenable to radiation-induced polymerization. Binder components (A) of this kind preferably possess at least two ethylenically unsaturated terminal groups. Examples of suitable ethylenically unsaturated terminal groups include acrylate or methacrylate groups. These at least two ethylenically unsaturated terminal groups may be alike or different. Whereas acrylate groups are preferred terminal groups for UV-curing systems, methacrylates are frequently cured via electron beams.

The number of ethylenically unsaturated terminal groups is preferably 2 to 20, more preferably 2 to 14, very preferably 2 to 9, and most preferably 2 to 8. The ethylenically unsaturated terminal groups may be alike or different within a binder molecule; in other words, for example, there may be acrylate groups alongside methacrylate groups or other ethylenically unsaturated groups.

Where acrylate and/or methacrylate groups are present as ethylenically unsaturated terminal groups of the binder, the structure of the binder can be represented by the general formula (I)

in which the radicals R independently of one another are hydrogen or a is methyl group, n is 1 to 19, and A is an (n+1)-valent oligomeric or polymeric radical. A is preferably selected from the group of polyurethanes, polyesters, polyethers, polymelamines, polyallophanates, polyisocyanurates, polyepoxides, and polysiloxanes. The value for n is preferably 1 to 19, more preferably 1 to 13, very preferably 1 to 8, and with particular preference 1 to 7.

The coated polycarbonate substrates produced by the method of the invention exhibit increased scratch resistance for all radicals A. Binders of the general formula (I) which have proven particularly advantageous in the context of additional chemical resistance are those for which A is a polyurethane radical, polyester radical, polyallophanate radical or polyisocyanurate radical. In the context of additional weathering resistance, polyurethanes are especially preferred as radicals A.

Resins of the general formula (I) are generally referred to as radiation-curing acrylate or methacrylate resins. In contrast to conventional acrylate or methacrylate resins, the radiation-curing resins possess at least two terminal carbon double bonds. By "terminal" is meant, in the present specification, in the case of an exclusively linear divalent radical A, the alpha and omega positions in the molecule, whereas in the case of comblike and dendritic structures of A, the comb ends and arm ends are also embraced by the term "terminal".

The compounds of the general formula (I) are obtained through the incorporation of terminal acrylic or methacrylic acid radicals onto the prepolymers derived from the radicals A. Where the radicals A contain hydroxyl groups terminally, it is possible for acrylic and/or methacrylic acid to be attached by condensation, with the formation of ester bonds. Where A carries amino groups terminally, amide bonds are formed instead of the ester bonds. In principle it is possible to employ all of the attachment strategies that are familiar to the skilled worker in this field. Thus, terminal isocyanate groups of the radicals A can be reacted with hydroxy esters of acrylic acid or methacrylic acid. Also possible is an addition reaction between the carboxyl group of the acrylic or methacrylic acid and epoxy groups. This produces, in turn, hydroxyl groups which are amenable to reaction with acrylic or methacrylic acid or their acid chlorides.

Examples of the binders which are preferably free-radically crosslinking by UV irradiation and have at least two ethylenically unsaturated terminal groups are multiacrylic- and/or multimethacrylic-functionalized polyurethanes, polyesters, polyethers, polymelamines, polyallophanates, polyisocyanurates, polyepoxides, and polysiloxanes, and their oligomeric forms, and also their hybrid forms, such as mixed polyester-urethanes, for example. "Multifunctional" in this context means at least "difunctional".

Thus, for example, it is possible to use multiacrylate-functionalized binders such as an epoxy diacrylate (Craynor 132 from Sartomer), a propoxylated pentaerythritol triacrylate (Photomer 4171 from Cognis Deutschland GmbH & Co. KG), a melamine pentaacrylate (Actilane 890 from Akzo Nobel Chemical GmbH), an aliphatic urethane hexaacrylate oligomer (Ebecryl 1290 from UCB GmbH), an aliphatic urethane tetraacrylate oligomer (Sartomer CN 925 from Craynar) or an ester acrylate (DPHA from UCB GmbH).

Through the choice of the polymer oligomer backbone A of the binder, i.e., the choice of, for example, polyurethane, polyester, polyether, polymelamine, polyallophanate, polyisocyanurate, polyepoxide or polysiloxanes, it is possible to exert influence on the properties of the cured coating, particularly with regard to its chemical resistance, light stability, toughness, adhesion, and abrasion resistance. Polymers which prove advantageous in their combination of the aforementioned properties include, in particular, polyurethanes, polyesters, and polyethers, among which polyurethanes and polyesters are especially preferred.

In terms of their architecture, as well as the linear compounds of the general formula (I), those having comblike or, preferably, dendritic structures are also suitable. Among the compounds of the formula (I), particular preference is given to those having dendritic structures and terminal acrylic and/or methacrylic acid groups. Of these, preference is given in turn to those who oligomer backbone is a dendritic polyester. Even at high molar masses, such compounds are notable for relatively low viscosities; they permit high crosslinking densities and an improvement in scratch resistance and chemical resistance. Furthermore, they are distinguished by a very low level of contraction in conjunction with rapid curing.

When acrylate- and/or methacrylate-modified dendritic polyesters are employed it is possible to dispense entirely with the use of photoinitiators (PI), especially when, for example, aminic synergists in other words amines having a methylene group in the vicinity of the nitrogen, are present in the composition. The function of the aminic synergists is to reduce the oxygen inhibition by forming free radicals. There is then, consequently, no need to use synergists if curing takes place in the absence of oxygen, such as under an inert gas atmosphere like a nitrogen atmosphere, for example.

The Nanoparticles (B)

It is essential to the invention that the coating compositions comprise silicon dioxide nanoparticles (B) having a $d_{50}$ of 80 nm to 300 nm, preferably of 90 nm to 250 nm, and more preferably of 100 nm to 200 nm. This $d_{50}$ is defined as the particle size in the particle size distribution at which 50% by weight of the particles have a smaller particle size.

Furthermore it is essential to the invention that the nanoparticles (B) have a particle size distribution such that less than 15% by weight of the particles have a size in the range of less than 80 nm, 75% to 95% by weight of the particles have a size in the range from 80 to 300 nm, 0% to 5% by weight of the particles have a size in the range from more than 300 to 1000 nm, and 0% to 5% by weight of the particles have a size in the range from more than 1000 nm to 10 000 nm.

Use is made in particular of nanoparticles which have a particle size distribution such that less than 10% by weight of the particles have a size in the range of less than 80 nm, 80% to 90% by weight of the particles have a size in the range from 80 to 300 nm, 0% to 5% by weight of the particles have a size in the range from more than 300 to 1000 nm, and 0% to 5% by weight of the particles have a size in the range from more than 1000 nm to 10 000 nm.

The particle size distribution is determined preferably in accordance with the principle of laser diffraction on a laser diffractometer (Horiba LA 920). For this purpose, first of all, a sample of the silica dispersion is taken with stirring, transferred to a glass beaker, and diluted, by adding solvent without addition of dispersing additives, to give a dispersion having an $SiO_2$ weight fraction of approximately 1% by weight. Immediately after the dispersing operation, an aliquot of the dispersion has its particle size distribution determined using the laser diffractometer (Horiba LA 920). For the measurement it is appropriate to choose a relative refractive index on the part of the solvent. All of the measurements are made at room temperature. The particle size distribution and also the relevant variables, such as the $d_{50}$, the particle size distribution q3(x) (corresponding to the differentiated cumulative distribution, i.e. the first derivation of the cumulative distribution) or the cumulative distribution Q3 (x) are automatically calculated by the instrument and displayed graphically. The notes in the operating instructions should be observed.

Only through the use of these silicon dioxide particles with the very specific particle size distribution is it ensured, surprisingly, that the resulting coatings have a high transparency, despite the fact that the nanoparticles have an average particle size significantly greater than that of the nanoparticles used in known coating compositions for coating polycarbonate substrates or other transparent substrates. Generally speaking, indeed, the particle size selected should be small in comparison to the wavelength of visible light, in order to ensure transparency in the resulting coating. Accordingly the nanoparticles used in the coating compositions of U.S. Pat. No. 6,420,451 have small particle sizes of between 2 and 60 nm, preferably between 5 and 50 nm.

Nanoparticles (B) used are nanoparticles based on silicon dioxide. Use is is made in particular of what are called fumed silicas, which are obtained by flame hydrolysis of silicon-halogen compounds. Particles of this kind are available commercially, for example, under the name Aerosil® from Evonik Degussa.

In the coating compositions it is also possible to employ nanoparticles whose surface has been modified with monomeric or oligomeric compounds. Surface modification is typically accomplished by attachment of groups which are located on the nanoparticle surface, such as hydroxyl groups, for example, to monomeric or oligomeric compounds. These monomeric or oligomeric compounds accordingly contain at least one group with affinity for the groups located on the nanoparticle surface. The attachment may take place, for example, through covalent bonding, ionic attachment or physisorption. The fraction of the monomeric or oligomeric compounds that is not needed for attachment to the nanoparticle surface preferably protrudes wholly or partly into the medium surrounding the nanoparticles.

Besides the group necessary for attachment to the surface of the nanoparticles, the monomeric or oligomeric compounds used for surface modification may also contain further functional groups, which are capable, for example, of reacting with the binder component (A). Surface modification of this kind is accomplished, for example, by addition of hydrolysable silanes, which also carry at least one further functional group, to the nanoparticles.

Examples of hydrolysable silanes suitable for the surface modification of nanoparticles include those silanes which, as a group reactive toward the binder (A), contain a vinyl group, an acrylate group, a methacrylate group, a glycidyl group, an amino group, a hydroxyl group or a mercapto group.

is It is preferred to use, in accordance with the invention, surface-modified nanoparticles (B) based on silanized, pyrogenically prepared silicas, more particularly based on pyrogenically prepared silicas which have dimethylsilyl groups and/or monomethylsilyl groups fixed on the surface. These nanoparticles (B) employed with particular preference are described in DE-A-10200602098, for example, and can be prepared by, for example, surface-modifying a pyrogenically prepared silicon dioxide, especially pyrogenically prepared silicon dioxide having a BET surface area of 200±25 m²/g, with dimethyldichlorosilane and/or monomethyl-trichlorosilane.

The surface-modified silicon dioxide is preferably then structurally modified. This structural modification takes place, as is known, by mechanical action. Structural modification may be accomplished, for example, using a batch or continuous ball mill. If desired, this may be followed by aftergrinding, using an air jet mill or pinned disk mill, for example, and/or by heat treatment, in a drying cabinet, for example, or continuously in a fluid bed or fluidized bed. The preparation of silanized, structurally modified pyrogenically prepared silicas is also described, for example, in WO04/020532.

These nanoparticles employed with particular preference are available commercially under the name Aerosil® R9200 from Evonik Degussa.

In the coating composition the nanoparticles (B) are used in dispersion preferably in at least part of the binder (A) or else—if two or more different binders (A) are employed in the coating composition of the invention—in at least part of at least one binder (A).

The dispersing of the nanoparticles in the binder or binders takes place typically with addition of at least one suitable, commercial dispersing is additive.

Preference here is given to using dispersing additives (D1) based on phosphoric esters which are based on polystyrene oxide-block (b)-polyalkylene oxide copolymers. Particular preference is given to using dispersing additives (D1) based on phosphoric esters which are based on polystyrene oxide-block (b)-polyalkylene oxide copolymers, of the general structural formula (II)

$$[RO(SO)_a(EO)_b(CH_2CHCH_3O)_c(BO)_d]_xP(O)(OH)_{3-x} \quad (II)$$

where
R=straight-chain or branched or cycloaliphatic radical having 1 to 22 carbon atoms, preferably R=isononyl radical or butyl radical,
SO=styrene oxide,
EO=ethylene oxide,
BO=butylene oxide, and
a=1 to <2,
b=3 to 100,
c=0 to 10,
d=0 to 3,
x=1 or 2, and
b>=a+c+d.

Such preferred dispersing additives (D1) are described for example in EP-B-1 167 452. They are available commercially for example under the name Tego® Dispers 655 from Evonik Degussa.

Particular preference is given in accordance with the invention to using a mixture of two or more dispersing additives, more particularly a mixture of at least one dispersing additive (D1) based on phosphoric esters which are based on polystyrene oxide-block (b)-polyalkylene oxide copolymers, and at least one dispersing additive (D2). With very particular preference a mixture is employed here of at least one dispersing additive (D1) of the structural formula (II) with at least one non-(D1) dispersing additive (D2) based on reaction products of amino-functional polymers, polyesters, and polyethers.

The use of this mixture of at least one dispersing additive (D1) and at least one dispersing additive (D2) in the nanoparticle dispersions has the consequence of a rheological activity on the part of the inventively employed silicon dioxide dispersions that is much lower in comparison to conventional silicas, and thus allows the silicon dioxide nanoparticles to be used even at relatively high concentrations without adversely affecting the appearance of the film surface, and also ensures good processing viscosity in the resulting coating compositions.

Use is made more particularly of dispersing additives (D2) which are obtained by partial or complete reaction of
D2A) one or more amino-functional polymers with
D2B) one or more polyesters of the general formula (III)/(IIIa)

$$T-C-(O)-[O-A-C(O)]_x-OH \quad (III)$$

$$T-O-[C(O)-A-O-]_yZ \quad (IIIa)$$

and
D2C) one or more polyethers of the general formula (IV)/(IVa)

$$T-C-(O).B-Z \quad (IV)$$

$$T-O-B-Z \quad (IVa)$$

where
T is a hydrogen radical and/or an unsubstituted or substituted, linear or branched aryl, arylalkyl, alkyl or alkenyl radical having 1 to 24 carbon atoms,
is A is at least one divalent radical selected from the group of linear, branched, cyclic, and aromatic hydrocarbons,
Z is at least one radical selected from the group of sulfonic acids, sulfuric acids, phosphonic acids, phosphoric acid, carboxylic acids, isocyanates, epoxides, especially of phosphoric acid and (meth)acrylic acid, B is a radical of the general formula (V)

—(ClH2lO)a-(CmH2mO)b-(CnH2nO)c-(SO)d— (V)

where
a, b, and c independent of one another are values from 0 to 100, with the proviso that the sum of a+b+c is ≥0, preferably 5-35, more particularly 10-20, and with the proviso that the sum of a+b+c+d is >0,
d is ≥0, preferably 1 to 5,
l, m, and n, independently of one another, are each ≥2, preferably 2-4,
x and y independently of one another are ≥2.

These dispersing additives (D2) are described for example in EP-A-1 685 895.

The dispersion of the nanoparticles (B) used with preference in accordance with the invention is with particular preference prepared by carrying out mixing and preliminary dispersing of the above-described nanoparticles, preferably structurally modified silicon dioxide nanoparticles, more particularly surface-modified, structurally modified silicon dioxide nanoparticles which have dimethylsilyl groups and/or monomethylsilyl groups on the surface, with at least part of the binder (A) or else—if two or more different binders (A) are employed in the coating composition of the invention—in at least part of at least one binder (A). With particular preference this preliminary dispersion further comprises at least one dispersing additive (D2), more particularly a dispersing additive (D2) based on reaction products of amino-functional polymers, polyesters, and polyethers. This dispersing may take place by means, for example, of a bead mill.

Thereafter, preferably, at least one dispersing additive (D1) is added to the resulting preliminary dispersion and, with a high input of energy, with the use for example of a ball mill, such as the Netzsch LabStar LS1 from Netzsch-Feinmahltechnik GmbH, using ZrO2 grinding media having a diameter d of 0.65 mm, the nanoparticles are ground to the desired inventive particle size with the $d_{50}$ of 80 to 300 nm.

It will be appreciated, however, that other nanoparticles having the sizes according to the invention, and obtained by other, customary methods, using, if appropriate, suitable dispersing additives, including dispersing additives other than the additives D1 and/or D2 described above, can also be used.

The Optional Solvent (C) and/or Optional Reactive Diluent Used

The coating compositions employed in the method of the invention may if appropriate additionally comprise solvents (C). In addition to or instead of the solvent (C), the coating compositions employed in accordance with the invention may if desired also comprise reactive diluents. The use of reactive diluents is preferred in this context from the standpoint of emissions avoidance, since the reactive diluents undergo copolymerization with component (A). The reactive diluents or solvents, however, are to be chosen such that, in the mixture that is employed of the solvents and/or reactive diluents, or if they are used in an unmixed form, they are very largely optically inert with respect to the polycarbonate substrate and preferably do not detract from its transparency. "Inert" in this sense means that there is no clouding visible to the eye. The term "inert" does not, however, rule out the capacity of the solvents and/or reactive diluents to cause deliberate swelling of the polycarbonate substrate, which can lead to an improvement in the adhesion. Another function of the solvents and/or reactive diluents, besides reducing the viscosity of the coating composition, is to allow an extremely uniform flow of the coating composition on the substrate.

Particularly suitable solvents are ethanol, isopropanol, n-butanol, ethyl acetate, butyl acetate, solvent naphtha, methyl ethyl ketone, 1-methoxyprop-2-yl acetate, acetone or tetrahydrofuran, preference being given in particular to combinations of different solvents. It is particularly preferred to use combinations of the solvents ethanol, isopropanol, n-butanol, ethyl acetate, butyl acetate, methyl ethyl ketone, and 1-methoxyprop-2-yl acetate.

Examples of reactive diluents which can be used are low molecular mass acrylic esters or methacrylic esters. These include, for example, the acrylic and methacrylic esters of trimethylolpropane, pentaerythritol, and dipentaerythritol, alkoxylated glycerol triacrylate or alkoxylated glycerol trimethacrylate, such as propoxylated glycerol triacrylate or propoxylated glycerol trimethacrylate, tris(2-hydroxyethyl) isocyanotriacrylate, tris(2-hydroxyethyl) isocyanotrimethacrylate, acrylic acid-modified carbonic esters and oxazolidones, isobornyl acrylate, tetrahydrofuryl acrylates, 1,6-hexanediol diacrylate, lauryl acrylate, isodecyl acrylate, and octyldecylacrylate.

Further Constituents of the Inventively Employed Coating Composition

The coating compositions used in the method of the invention may advantageously comprise photoinitiators (PI). As already set out above, the addition of the photoinitiators, in terms of their nature and amount, is is dependent on the binder (A) employed and may even be omitted if dendritic polyester acrylates are used. In the latter case, however, it is then advantageous for the coating composition to comprise aminic synergists.

Suitable photoinitiators are, in particular, those from the group consisting of alpha-hydroxy ketones, alpha-amino ketones, phenylglyoxylates, benzyl dimethyl ketals, monoacylphosphines, bisacylphosphines, phosphine oxides, metallocenes, and iodonium salts. Preferred examples include 1-hydroxycyclohexyl phenyl ketone (Irgacure® 184), 2-hydroxy-2-methyl-1-phenyl-1-propanone (Irgacure® 1173), 2-hydroxy-1-{4-[4-(2-hydroxy-2-methylpropionyl)benzyl]phenyl}-2-methylpropan-1-one (Irgacure® 127), 2-hydroxy-1-[4-(2-hydroxyethoxy)phenyl]-2-methyl-1-propanone (Irgacure 2959), methyl benzoyl formal (Darocure® MBF), phosphine oxide, phenylbis(2,4,6-trimethylbenzoyl) (Irgacure® 819), and diphenyl-(2,4,6-trimethylbenzoyl)phosphine oxide (Lucirin® TPO). Besides the abovementioned constituents (A), (B), optionally (C), optionally (D1), optionally (D2), optionally (PI), and, optionally, the reactive diluent, the coating compositions used in the method of the invention may also comprise further additives typical of clearcoat materials, such as, for example, flow control agents, light stabilizers such as UV absorbers and free-radical scavengers, adhesion promoters, deaerating agents, and wetting agents.

Components (A), (B), optionally (C), optionally (D1), optionally (D2), optionally (PI), optionally reactive diluents, and also the additives typical of clearcoat materials may be added in dissolved or dispersed form to the coating composition used in the method of the invention. The solvents and/or reactive diluents of these components, used for this purpose, are assigned to constituent (C) as far as the complete coating composition is concerned. In other words, constituent (C) also includes the solvents and/or reactive diluents which enter the coating composition by way of the other components. In order to ensure particularly good flow of the coating and hence in order to obtain particularly smooth surfaces, commercial flow control agents such as Byk® 333, BYK® 310, BYK® UV3570, for example, can be added to the coating composition employable in accordance with the invention. Additions of this kind lower the surface tension of the UV coating material, thus ensuring effective wetting of the substrate under appropriate application conditions.

In order that the substrate is not exposed to permanently damaging UV radiation, UV absorbers may be added to the coating composition employed in accordance with the invention. Examples of these classes are 2-(2-hydroxyphenyl)benzotriazoles, 2-hydroxybenzophenone, hydroxyphenyl-s-triazines, oxalanilides, hydroxyphenylpyrimidines, salicylic acid derivatives, and cyanoacrylates, according to Lichtschutzmittel für Lacke, Curt R. Vincentz Verlag, Hanover, 1996, page 21.

Furthermore, free-radical scavengers such as sterically hindered amines (hindered amine light stabilizers—HALS) or antioxidants may be employed, and likewise prevent permanent damage to the coating of the invention. The best-known representatives of the antioxidants are the sterically hindered phenols. In the case of the sterically hindered amines (HALS), in contrast, it is almost exclusively derivatives of 2,2,6,6-tetra-methylpiperidine that are employed.

If necessary it is possible to add adhesion promoters, which ensure the permanent adhesion to the substrate (polycarbonate, for example) and/or primer. Examples of this class of additive are chlorinated polyolefins, acidic polyesters or phosphoric acid adducts. The use of deaerating agents may also be necessary in order to avoid popping marks on the film surface. Suitability for this purpose is possessed by commercial deaerating agents such as Byk-A 500, Byk-A 50, Byk-A 515, BYK 390, BYK 306, BYK 315 and BYK 356, for example.

The coating compositions employed in accordance with the invention preferably contain, based on the weight of constituent (A) plus the weight of nanoparticles (B) plus the weight of reactive diluent (C) if used:

(A) 30% to 90%, more preferably 40% to 85%, and very preferably 50% to 80% by weight of at least one radiation-curing binder (A),
(B) 10% to 40%, more preferably 15% to 30%, and very preferably 15% to 25% by weight of nanoparticles (B), and
(C) 0% to 40%, more preferably 5% to 30%, by weight of at least one reactive diluent which is inert toward polycarbonate.

This means that the weight of constituent (A), of nanoparticles (B), and the weight of the reactive diluent from constituent (C) add up to 100%. Based on the total weight of constituent (A) plus (B) plus, if used, reactive diluents, 10% to 40%, preferably 15% to 30%, and more preferably 15% to 25% by weight of the silicon dioxide nanoparticles (B) are employed.

If solvents are present they may be included in an amount of up to 70% by weight, based on the overall coating composition.

The coating compositions used in accordance with the invention preferably further contain 0% to 40% by weight, preferably 10% to 30% by weight, based on the weight of nanoparticles (B), of at least one dispersing additive. With particular preference the coating compositions employed in accordance with the invention contain 2.5% to 15% by weight of at least one dispersing additive (D1) and 5% to 25% by weight of at least one dispersing additive (D2), the amounts being based in each case on the weight of the nanoparticles (B).

Finally the coating composition contains preferably

0% to 10%, more preferably 1% to 8%, and very preferably 2% to 7% by weight of one or more photoinitiators (PI), the amounts being based on the total weight of the binder (A) plus the weight of any reactive diluent (C) used, and 0.1% to 15%, more preferably 0.5% to 10%, and very preferably 0.8% to 7% by weight of further additives typical of clearcoat materials, the amounts being based on the total weight of the coating composition.

Polycarbonate Substrate

By a polycarbonate or polycarbonate substrate is meant, in the present invention, not only homopolycarbonates but also copolycarbonates. In a known way the polycarbonates can be linear or branched. It is also possible for some of the carbonate groups of the homo- or copolycarbonates to have been replaced by dicarboxylic ester groups or other polycarbonate-compatible groups. Preferred among the dicarboxylic ester groups are aromatic dicarboxylic ester groups. Where the polycarbonates include dicarboxylic acid radicals as well as carbonic acid radicals, they are also referred to as polyester carbonates, which, as maintained above, are likewise covered by the term "polycarbonates". Where dicarboxylic ester groups are present, they may be included in a fraction of up to 80 mol %, preferably 20 to 50 mol %.

Polycarbonates can be produced by any of the processes known from the literature. Suitable processes for producing polycarbonates are, for is example, their production from bisphenols with phosgene by the phase interface process, or the process from a homogeneous phase (pyridine process), or from bisphenols with carbonic esters by the melt transesterification process. These production processes are for example described in H. Schnell, "Chemistry and Physics of Polycarbonates", Polymer Reviews, Volume 9, pp. 31 to 76, Interscience Publishers, New York, London, Sydney, 1964. The stated production processes are also described in D. Freitag, U. Grigo, P. R. Müller, H. Nouvertne, "Polycarbonates" in Encyclopedia of Polymer Science and Engineering, Volume 11, Second Edition, 1988, pages 648 to 718, and in U. Grigo, K. Kircher and P. R. Müller "Polycarbonate" in Becker, Braun, Kunststoff-Handbuch, Volume 3/1, Polycarbonate, Polyacetale, Polyester, Celluloseester, Carl Hanser Verlag Munich, Vienna 1992, pages 117 to 299. The melt transesterification process is more particularly described in H. Schnell, "Chemistry and Physics of Polycarbonates", Polymer Reviews, Volume 9, pp. 44 to 51, Interscience Publishers, New York, London, Sydney, 1964, and also in DE 10 31 512 A, U.S. Pat. Nos. 3,022,272, 5,340,905, and 5,399,659. The polycarbonates produced by the processes described above possess a weight-average molecular weight Mw of preferably 12 000 to 400 000 g/mol, more preferably of 18 000 to 80 000 g/mol, and very preferably of 22 000 to 60 000 g/mol.

The polycarbonates and polycarbonate substrates can be present in any desired three-dimensional form, such as, for example, in the form of sheets, windows, soundproof walls, spectacle lenses, optical lenses or parts of motor vehicles such as motorcycles, buses, trucks or automobiles, utility vehicles and/or aircraft parts, such as glazing elements, especially tailgate windows and nonmoving side windows, and also headlight glasses or beam dispersal elements of vehicles, especially automobiles, and aircraft, and the like. Particular preference is given to transparent polycarbonates and polycarbonate substrates, preferably those with a transmittance of >80% for visible light. Likewise suitable as polycarbonate substrates are, for example, compact discs (CDs) or digital video discs or digital versatile discs (DVDs).

Application and Curing of the Coating Composition, and Coated Polycarbonate Substrates Application to the substrate takes place by standard coating methods such as dipping, flow-coating, injecting, brushing, knife coating, rolling, spraying, falling-film application, spin coating or spinning, for example. Particularly advantageous is the application of the coating compositions in a dipping or flow-coating operation and also by spray application with a low coat thickness and good flow.

For this purpose the polycarbonate substrate may be pretreated with a primer before the coating composition is applied. Examples of suitable primers include compositions like those used in the method of the invention but without any nanoparticles (B) included. Preferably the method of the invention takes place without primer treatment of the substrate. With particular preference the method of the invention takes place in a one-coat process, in other words by application of just one coat of the coating composition directly to the polycarbonate substrate without chemical pretreatment.

After the coating has been applied, the substrate has been allowed to drip-dry, where appropriate, and the coating has then been flashed off, in ways which are known to the skilled worker, the coating is cured. Curing may take place by exposure to high-energy radiation, such as UV radiation or electron beams, for example. Radiation sources used are preferably low-pressure mercury lamps, medium-pressure lamps, high-pressure lamps, and fluorescent tubes, pulsed emitters or excimer is emitters, which preferably emit light in a wavelength range between $\lambda=200$ to 700 nm, more preferably $\lambda=200$ to 500 nm, and very preferably $\lambda=200$ to 400 nm. Preference is given, moreover, to lamp or emitter systems which, through modification of the reflector, impose a low thermal load on the substrate. Lamp systems of this kind are known in the form of URS reflector systems from IST Metz GmbH. The radiation dose typically sufficient for UV curing is situated between 100 to 6000 mJ/cm$^2$, more preferably 300 to 4000 mJ/cm$^2$, and very preferably 300 to 3000 mJ/cm$^2$. Depending on the distance between substrate and UV lamp, lamp output, and reflector system, UV irradiation intensities of between 100 to 3000 mW/cm$^2$, but with a special preference 100 to 1500 mW/cm$^2$, are employed.

Irradiation may be carried out under an oxygen-depleted atmosphere. "Oxygen-depleted" means that the oxygen content of the atmosphere is less than the oxygen content of air (20.95% by weight). The atmosphere may in principle also be oxygen-free, in that case being composed of an inert gas. Suitable inert gases are carbon dioxide, nitrogen, noble gases or combustion gases. A preferred range for UV curing in an oxygen-depleted atmosphere is between 0.1% to 5% by weight of residual oxygen. Irradiation of the coating material may also take place beneath transparent media such as polymeric films, glass or liquids. Irradiation under an oxygen-depleted atmosphere has beneficial consequences in particular for the subsequent chemical resistance of the cured coating.

Following curing, coating and substrate are transparent. The coating obtained on the polycarbonate substrate has a haze value after curing and before exposure of less than 1, as determined using the BYK-Gardner Hazemeter AT-4727 instrument.

Following scratch exposure, measured with the Taber test in a method is based on ASTM 1044-05 and ASTM 1003-00, the exposed coating has a haze value of ≤5%, preferably ≤10%, more preferably ≤8%, determined in each case using the BYK-Gardner Hazemeter AT-4727 instrument.

The functionality of the binder (A) ought preferably to be 2 to 20, more preferably 3 to 10 or 3 to 9.

Further provided by the invention are coated polycarbonate substrates obtainable by the method of the invention. These may be, for example, sheets, windows, spectacle lenses, optical lenses, or vehicle and aircraft parts, covers, compact discs, digital versatile discs or digital video discs. Further provided by the invention is the coating composition employed in the method, and also the use of the coating composition to coat polycarbonate substrates, especially transparent polycarbonate substrates.

The invention is elucidated in more detail below with reference to examples.

EXAMPLE 1

1.1. Preparation of an Inventive Dispersion 1 of Nanoparticles 1

A preliminary dispersion was prepared from 30.1 kg of a commercial modified aliphatic tetrafunctional urethane acrylate having a number-average molecular weight of 2500 (Sartomer CN925 from Craynor) with 1.7 kg of a commercial dispersing additive based on reaction products of amino-functional polymers, polyesters, and polyethers (dispersing additive LA-D1045 from Evonik Degussa) and 8.2 kg of a commercial pyrogenically prepared silicon dioxide having a BET surface area of 200±25 m$^2$/g which had been silanized with dimethyldichlorosilane and then structurally modified in accordance with WO04/020532 (AEROSIL® is R 9200 from Evonik Degussa). For this purpose, the urethane acrylate Sartomer CN925 was introduced initially and the dispersing additive LA-D1045 and the silicon dioxide AEROSIL® R 9200 were added slowly with stirring (500 rpm). Subsequently the dispersion was dispersed at 900 rpm for 15 minutes. During this time the temperature of the mixture rose to 75° C. 4 kg of the resulting preliminary dispersion 1-1 were admixed with 50 g of a further commercial dispersing additive (TegoDispers® 655 from Evonik Degussa) based on phosphoric esters which are based on polystyrene oxide-block (b)-polyalkylene oxide copolymers. This preliminary dispersion 1-2 was ground using a ball mill (Netzsch LabStar LS1, ZrO2 grinding media, d=0.65 mm) for 21 hours and 16 minutes at a grinding stock temperature of approximately 81° C. and with a high energy input (grinding chamber pressure 1.5 bar, power consumption 27.73 kWh). The precise technical data in the course of dispersing are set out in Table 1 below:

TABLE 1

Technical data of the course of dispersing

| Sample # | Run time (min) | Rotational speed of stirrer (1/min) | Grinding chamber pressure (bar) | Grinding stock temperature (° C.) | Power consumption (kWh) | Haze (%) of the unexposed coating |
|---|---|---|---|---|---|---|
| Unb. PC.[1] | | | | | | 0.2 |
| Disp.[2] | | | | | | 12.5 |
| 1 | 1 | 1000 | 1.5 | 41 | 0.01 | 6 |
| 2 | 10 | 2475 | 1.4 | 80 | 0.13 | 3.5 |
| 3 | 154 | 2474 | 1.8 | 86 | 3.26 | 1.1 |
| 4 | 236 | 2774 | 1.8 | 84 | 5.05 | 0.7 |
| 5 | 296 | 2774 | 1.5 | 83 | 6.44 | 0.6 |
| 6 | 486 | 2474 | 1.6 | 83 | 10.85 | 0.5 |
| 7 | 561 | 2474 | 1.6 | 84 | 12.48 | 0.4 |
| 8 | 906 | 2474 | 1.5 | 81 | 20.05 | 0.4 |
| 9 | 1106 | 2474 | 1.5 | 81 | 24.21 | 0.3 |
| 10 | 1276 | 2474 | 1.5 | 81 | 27.73 | 0.3 |
| 11 | 1396 | 2699 | 1.6 | 81 | 30.53 | 0.3 |

[1]uncoated polycarbonate substrate
[2]haze value of the preliminary dispersion

The resulting inventive dispersion 1 contains very high fractions of silicon dioxide particles with a size of less than 1000 nm, the $d_{50}$ being 150 nm and the particle size distribution of the silanized, structurally modified silicon dioxide particles obtained being as follows:
less than 5% by weight in the range of less than 80 nm,
88% by weight in the range of 80 to 300 nm,
3% by weight in the range of more than 300 to 1000 nm, and
4% by weight in the range of more than 1000 nm to 10 000 nm.

Figure 1:
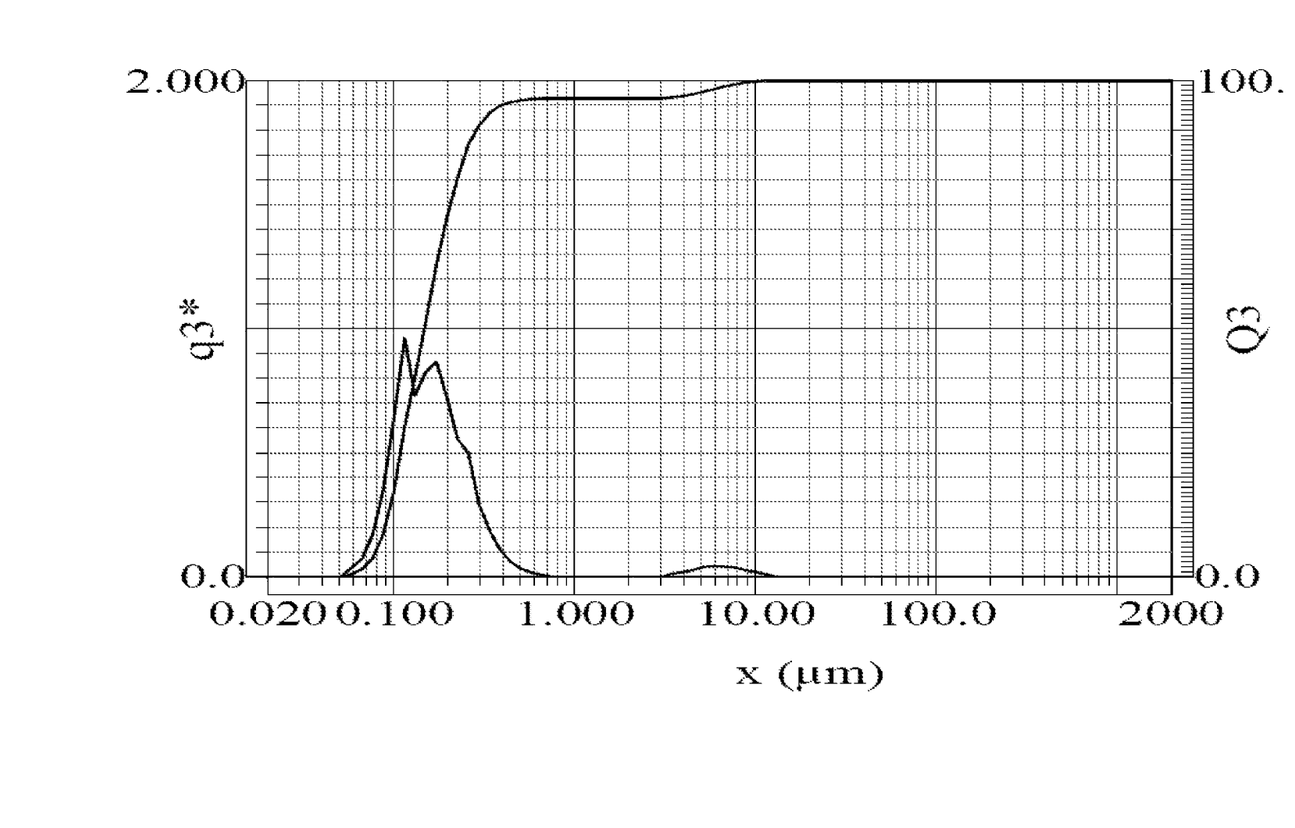
FIG. 1 shows the particle size distribution of an inventive dispersion of the silanized structurally modified silicon dioxide particles.

FIG. 1 shows the particle size distribution of the silanized structurally modified silicon dioxide particles obtained. Recorded therein as well as the particle size x are the cumulative distribution Q3(x) and the distribution density q3(x).

The resulting inventive dispersion 1 has a silicon dioxide nanoparticle content of 20% by weight, based on the total weight of the inventive dispersion 1.

1.2. Preparation of the Inventive Coating Composition 1

The constituents indicated in Table 2 are formulated with stirring to give the inventive coating composition 1.

2. COMPARATIVE EXAMPLE C1

2.1. Preparation of the Noninventive Coating Composition C1

The constituents indicated in Table 2 are formulated in the same way as for example 1, with stirring, to give the noninventive coating composition C1. This coating composition C1 differs from the inventive coating composition 1 in that, instead of the inventive dispersion of nanoparticles 1, the commercial dispersion of nanoparticles Nanopol® C784 (50% dispersion of colloidal silica sol in n-butyl acetate, with an average size of the surface-modified silicon dioxide particles of 20 nm (as determined by SANS=small-angle neutron scattering) from Nanoresins is employed.

TABLE 2

Composition of coating compositions 1 and C1

| Constituent | Example 1 amount in g | Comparative example C1 amount in g |
|---|---|---|
| n-Butanol | 4.5 | 4.5 |
| Ethanol | 13.6 | 13.6 |
| Isopropanol | 18.3 | 18.3 |
| Ethyl acetate | 13.6 | 3.6 |
| Irgacure ® 819[1] | 0.3 | 0.3 |
| Irgacure ® 184[2] | 1.12 | 1.12 |
| Byk UV 3570[3] | 0.4 | 0.4 |
| Binder (A) = Sartomer CN925[4] | — | 38.2 |
| Nanoparticle dispersion 1 with 20% SiO2 (inventive) | 48.18 | — |
| Nanopol ® C784, 50% in butyl acetate (comparative) | — | 20 |
| Total | 100 | 100 |
| % solids (theoretical)[5] | 50 | 50 |
| SiO2 content in %, based on solids (theoretical) | 20 | 20 |
| CN925 content, based on overall composition | 35.87 | 38.2 |

[1] commercial photoinitiator; bis(2,4,6-trimethylbenzoyl)phenylphosphine oxide
[2] commercial photoinitiator; 1-hydroxycyclohexyl phenyl ketone
[3] commercial flow control additive for UV coating materials from Byk
[4] commercial modified aliphatic tetrafunctional urethane acrylate with a number-average molecular weight of 2500 from Craynor
[5] calculated on the assumption that the solids also includes all the additives, i.e., that all constituents apart from solvents are counted as solids

3. Production of an Inventive Coating 1 and of a Coating C1 From Comparative Example C1

The coating composition 1 described in Table 1 was applied using a 36 μm coating rod to a polycarbonate panel. The panel was then dried in an oven at 80° C. for 5 min and subsequently cured with UV light in a common UV system (IST Minicure, 2 mercury lamps, 3.0 m/s belt speed). The dose was 3.0 J/cm2.

4. Testing of the Inventive Coating 1 and of the Noninventive Coating C1

4.1. Assessment of the Haze Value

Directly after the curing of the coating the haze values of the coated polycarbonate substrates were determined using the BYK-Gardner Hazemeter AT-4727 instrument. The results are set out in Table 3.

4.2. Abrasion Resistance Test

The scratch resistance of the surfaces was investigated by means of the Taber test. The Taber test and the subsequent haze measurement were carried out by a method based on ASTM D 1044-05 and ASTM D 1003-00, by means of the BYK-Gardner Hazemeter AT-4727 instrument, the samples being stored, prior to measurement, not under standard conditions at 23° C. and 50% relative humidity, and a suction apparatus with an opening of 8 mm rather than the prescribed 11 mm being used. The results are set out in Table 3.

TABLE 3

Test results of the coatings

| | Haze (%) of the unexposed coating | Haze (%) after Taber test |
|---|---|---|
| Inventive coating 1 | 0.3 | 6-7 |
| Noninventive coating C1 | 0.3 | 9-10 |

What is claimed is:

1. A method of coating polycarbonate substrates, comprising applying to a polycarbonate substrate a transparent coating composition comprising (A) at least one radiation-curing binder, (B) nanoparticles, and (C) optionally solvents and/or optionally reactive diluents, and wherein
    (i) the nanoparticles (B) comprise silicon dioxide nanoparticles,
    (ii) the silicon dioxide nanoparticles (B) have a $d_{50}$ of between 80 and 300 nm, and
    (iii) the silicon dioxide nanoparticles (B) have a particle size distribution such that less than 15% by weight of the particles have a size in the range of less than 80 nm, 75% to 95% by weight of the particles have a size in the range from 80 to 300 nm, 0% to 5% by weight of the particles have a size in the range from more than 300 to 1000 nm, and 0% to 5% by weight of the particles have a size in the range from more than 1000 nm to 10 000 nm.

2. The method of claim 1, wherein the nanoparticles (B) have a particle size distribution such that less than 10% by weight of the particles have a size in the range of less than 80 nm, 80 % to 90% by weight of the particles have a size in the range from 80 to 300 nm, 0% to 5% by weight of the particles have a size in the range from more than 300 to 1000 nm, and 0% to 5% by weight of the particles have a size in the range from more than 1000 nm to 10 000 nm.

3. The method of claim 1, wherein the transparent coating composition comprises nanoparticles (B) based on silanized, pyrogenically prepared silicas comprising dimethylsilyl groups and/or monomethylsilyl groups fixed on surfaces of the nanoparticles.

4. The method of claim 1, wherein the coating composition further comprises at least one dispersing additive.

5. The method of claim 4, wherein the coating composition contains 10% to 40%, by weight, based on the weight of constituent (A) plus the weight of nanoparticles (B) plus the weight of reactive diluent if used, of the nanoparticles (B), and/or 0% to 40% by weight, based on the weight of the nanoparticles, of one or more dispersing additives.

6. The method of claim 4, wherein the coating composition comprises at least one dispersing additive (D1) based on a phosphoric ester which is based on polystyrene oxide-block (b)-polyalkylene oxide copolymers.

7. The method of claim 6, wherein the coating composition comprises at least one dispersing additive (D1) based on a phosphoric ester which is based on polystyrene oxide-block (b)-polyalkylene oxide copolymers, of the general structural formula (II)

[RO(SO)$_a$(EO)$_b$(CH$_2$CHCH$_3$O)$_c$(BO)$_d$]$_x$P(O)(OH)$_{3-x}$   (II)

where
R=straight-chain or branched or cycloaliphatic radical having 1 to 22 carbon atoms,
SO=styrene oxide,
EO=ethylene oxide,
BO=butylene oxide, and
a=1 to <2,
b=3 to 100,
c=0 to 10,
d=0 to 3,
x=1 or 2, and
b>=a+c+d.

8. The method of claim 6, wherein the coating composition comprises a mixture of at least one dispersing additive (D1) based on a phosphoric ester which is based on polystyrene oxide-block (b)-polyalkylene oxide copolymers, and at least one non-(D1) dispersing additive (D2).

9. The method of claim 8, wherein the coating composition comprises at least one dispersing additive (D2) based on reaction products of amino-functional polymers, polyesters, and polyethers.

10. A coating composition comprising (A) at least one radiation-curing binder, (B) nanoparticles, and (C) optionally solvents and/or optionally reactive diluents, and wherein
(i) the nanoparticles (B) comprise silicon dioxide nanoparticles,
(ii) the silicon dioxide nanoparticles (B) have a d$_{50}$ of between 80 and 300 nm, and
(iii) the silicon dioxide nanoparticles (B) have a particle size distribution such that less than 15% by weight of the particles have a size in the range of less than 80 nm, 75% to 95% by weight of the particles have a size in the range from 80 to 300 nm, 0% to 5% by weight of the particles have a size in the range from more than 300 to 1000 nm, and 0% to 5% by weight of the particles have a size in the range from more than 1000 nm to 10 000 nm.

11. The coating composition of claim 10, comprising at least one dispersing additive (D1) based on a phosphoric ester which is based on polystyrene oxide-block (b)-polyalkylene oxide copolymers of the general structural formula (II)

[RO(SO)$_a$(EO)$_b$(CH$_2$CHCH$_3$O)$_c$(BO)$_d$]$_x$P(O)(OH)$_{3-x}$   (II)

where R=straight-chain or branched or cycloaliphatic radical having 1 to 22 carbon atoms,
SO=styrene oxide,
EO=ethylene oxide,
BO=butylene oxide, and
a=1 to <2,
b=3 to 100,
c=0 to 10,
d=0 to 3,
x=1 or 2, and
b>=a+c+d.

12. The coating composition of claim 10, comprising at least one dispersing additive (D2), based on reaction products of amino-functional polymers, polyesters, and polyethers.

13. A coated polycarbonate substrate made by the method of claim 1.

14. The coated polycarbonate substrate of claim 13, the substrate being at least one of sheets, windows, spectacle lenses, optical lenses, parts of motor vehicles, reflectors.

15. The coated polycarbonate substrate of claim 14, the substrates being at least one of parts of headlights and/or glazing elements of automobiles, and/or aircraft.

16. The method of claim 2, wherein the nanoparticles (B) have a d$_{50}$ of between 90 and 250 nm.

17. The method of claim 16, wherein the nanoparticles (B) have a d$_{50}$ of between 100 and 200 nm.

18. The method of claim 5, wherein the coating composition contains 15% to 30%, based on the weight of constituent (A) plus the weight of nanoparticles (B) plus the weight of reactive diluent if used, of the nanoparticles (B), and/or 10% to 30% by weight, based on the weight of the nanoparticles, of one or more dispersing additives.

19. The method of claim 18, wherein the coating composition contains 15% to 25%, by weight, based on the weight of constituent (A) plus the weight of nanoparticles (B) plus the weight of reactive diluent if used, of the nanoparticles (B), and/or 10% to 30% by weight, based on the weight of the nanoparticles, of one or more dispersing additives.

20. The coated polycarbonate substrate of claim 14, the substrate being at least one of parts of motor vehicles selected from the group consisting of motorbikes, buses, trucks or automobiles, utility vehicles and/or aircraft parts, or being at least one of a reflector selected from the group consisting of road reflectors, covers, compact discs, digital versatile discs or digital video discs.

21. A method of coating polycarbonate substrates, more particularly transparent polycarbonate substrates, by applying to a polycarbonate substrate a transparent coating composition comprising (A) at least one radiation-curing binder having at least two ethylenically unsaturated terminal groups, (B) nanoparticles, and (C) optionally solvents and/or optionally reactive diluents, characterized in that
(i) the coating composition comprises silicon dioxide nanoparticles (B),
(ii) the nanoparticles have a d$_{50}$ of between 80 and 300 nm, and
(iii) the nanoparticles (B) have a particle size distribution, determined in accordance with the principle of laser diffraction on a laser diffractometer, such that less than 15% by weight of the particles have a size in the range of less than 80 nm,
75% to 95% by weight of the particles have a size in the range from 80 to 300 nm, 0% to 5% by weight of the particles have a size in the range from more than 300 to 1000 nm, and
0% to 5% by weight of the particles have a size in the range from more than 1000 nm to 10,000 nm, and
(iv) the coating composition comprises at least one dispersing additive.

* * * * *